United States Patent [19]
Melbye et al.

[11] Patent Number: 5,412,194
[45] Date of Patent: May 2, 1995

[54] ROBUST CODING SYSTEM

[75] Inventors: Hartvig E. Melbye, Boulder; Robert N. Spurr, Englewood, both of Colo.

[73] Assignee: Storage Technology Corporation, Louisville, Colo.

[21] Appl. No.: 857,166

[22] Filed: Mar. 25, 1992

[51] Int. Cl.⁶ .............................. G06K 19/00
[52] U.S. Cl. .................... 235/437; 235/487; 371/37.2; 371/37.5
[58] Field of Search ............... 235/437, 487; 371/37.2, 371/37.5, 37.7

[56] References Cited

U.S. PATENT DOCUMENTS

| | | | |
|---|---|---|---|
| 3,753,227 | 8/1973 | Patel | 371/53 |
| 3,886,521 | 5/1975 | Dobras | 371/51.1 |
| 3,893,077 | 7/1975 | Myren | 371/57.1 |
| 4,013,997 | 3/1977 | Treadwell, III | 235/437 |
| 4,224,508 | 9/1980 | Kao | 235/437 |
| 4,360,916 | 11/1982 | Kustedjo et al. | 371/37.8 |
| 4,589,112 | 5/1986 | Karim | 371/37.2 |
| 4,873,631 | 10/1989 | Nathan et al. | 371/8.2 |
| 4,890,287 | 12/1989 | Johnson et al. | 371/37.2 |
| 4,896,025 | 1/1990 | Hasegawa | 235/437 |
| 4,930,129 | 5/1990 | Takashira | 235/380 |
| 5,070,504 | 12/1991 | Bossen et al. | 371/37.1 |
| 5,101,200 | 3/1992 | Swett | 235/437 |
| 5,161,163 | 11/1992 | Bossen et al. | 371/54 |
| 5,251,219 | 10/1993 | Babb | 371/37.7 |
| 5,303,214 | 4/1994 | Kulakowski et al. | 235/385 |

FOREIGN PATENT DOCUMENTS

| | | | |
|---|---|---|---|
| 0405099 | 1/1991 | European Pat. Off. | 235/437 |
| 3314783 | 10/1984 | Germany | 235/462 |
| 0088698 | 4/1989 | Japan | 235/437 |

*Primary Examiner*—Willis R. Wolfe
*Assistant Examiner*—Erick Solis
*Attorney, Agent, or Firm*—Duft, Graziano & Forest

[57] ABSTRACT

The robust coding system makes use of a robust bar code on a label to enable a label reading system to automatically reconstruct label indicia information, even though the label has been damaged and is partially obliterated. An error correcting code is incorporated into the bar code sequence imprinted on the label to detect and correct a plurality of errors in the bar code. The error correcting bar code digits can be interleaved with the data imprinted in bar code form on the label or appended thereto. In addition, when the robust coding system is used on labels for data media cartridges, additional information is included in the bar code field to identify the type of media contained in the media cartridge.

43 Claims, 4 Drawing Sheets

ROBUST CODING SYSTEM

FIELD OF THE INVENTION

This invention relates to coding systems and, in particular, to a coded label that contains machine-readable and human-readable indicia and also includes error correcting characters imprinted thereon as part of the label identification code in order to render the label indicia reconstructible if the label is damaged during use.

PROBLEM

Machine-readable bar codes as well as optical character recognition codes are in common use on labels today. The machine-readable bar codes are read by electronic readers while the optical character recognition codes are both machine-readable and human-readable. Labeling systems have made use of both the bar codes and the optical character recognition codes in order to uniquely identify objects to which the labels are attached.

One particular example is the use of labels on 3480-type magnetic tape cartridges in the data processing industry. These 3480-type magnetic tape cartridges are the industry standard media for reading and writing data thereon. These cartridges can be manually loaded into a cartridge tape drive or can be used in an automated cartridge library system such as the 4400 Automated Cartridge System (ACS) manufactured by Storage Technology Corporation of Louisville, Colorado. The 4400 Automated Cartridge System uses a robotic cartridge retrieval mechanism that is centrally located within a piecewise cylindrical library stack to access magnetic tape cartridges stored in individual cartridge storage locations in the cylindrical library stack. A coded label is applied to one end of each of the magnetic tape cartridges to uniquely identify each cartridge stored in this library system. The robotic cartridge retrieval system includes a camera to read bar code information imprinted on the cartridge label in order to uniquely identify the magnetic tape cartridges stored in the cartridge storage locations. The cartridge labels presently in use make use of a bar code, a redundant optical character recognition code as well as a color coding scheme on the cartridge labels to uniquely identify each magnetic tape cartridge. The color coding, optical character recognition code and bar code present the same cartridge identification indicia (volume serial number —VOLSER) in three different formats. The 4400 Automated Cartridge System only reads the bar code on the cartridge labels and the color coding and optical character recognition code are there for the convenience of a human operator in the event that the magnetic tape cartridge is removed from the automated cartridge library system and manually handled by an operator.

A difficulty with this label system is that if the bar code on a cartridge label becomes damaged and unreadable, the automated cartridge library system can no longer process the magnetic tape cartridge and must eject the magnetic tape cartridge from the library system in order to enable a human operator to replace the damaged label thereon. While damaged labels are presently not a significant problem in automated cartridge library systems, as the age of magnetic tape cartridges used in these systems increases and the magnetic tape cartridges are subjected to field use, the probability of label damage also increases. Therefore, the simple bar code used on these labels becomes ineffective to identify the magnetic tape cartridge as cartridge labels become damaged and magnetic tape cartridges must, on a more frequent basis, be ejected from the automated cartridge library system for label replacement.

Existing label systems make use of redundant indicia in order to enable the reconstruction of the data if the label is damaged. The indicia redundancy on a 3480-type magnetic tape cartridge label consists of printing the human-readable optical character recognition code indicia in a first direction in one column of the label and the same indicia in bar code form in a second direction (the reverse of the first direction) in the second column of the label. The volume identification number is thereby completely presented in both columns (right and left halves of the label) as well as in both the top and bottom halves of the label. The difficulty with this arrangement is that human intervention is required to reconstruct the label if even a single bar of the bar code is unreadable, since the automated cartridge library system only reads bar code indicia. The label indicia redundancy does not assist the automated cartridge library system to recover from bar code errors.

SOLUTION

The above described problems are solved and a technical advance achieved in the field by the robust coding system of the present invention which makes use of a robust bar code on a label in order to enable a label reading system to automatically reconstruct label indicia information even though the label has been damaged and is partially obliterated. The use of error correcting codes as part of the bar code sequence imprinted on the label eliminates the problems with existing label formats.

A preferred embodiment of this coding system is illustrated in use on a 3480-type magnetic tape cartridge label. In addition to the use of the error correcting codes, additional indicia is included on this label to delineate the type of media contained within the media cartridge. The 3480-type magnetic tape cartridge form factor is useable not only for magnetic tape of conventional format and composition but can also be used for helical scan tape, solid state memory, or other media. Indicia is included on the cartridge label to define the media contained within the media cartridge in order to prevent the automated cartridge library system or a human operator from inserting a media cartridge into the wrong type of media drive.

In one embodiment of this label configuration, the media identification portion of the cartridge label is a separate label applied by the manufacturer prior to the user adding the cartridge identification (VOLSER) label thereto. In a second embodiment, the cartridge label is a unitary structure that defines the type of media contained within the media cartridge as well as the user-defined cartridge identification number. In all cases, the use of the robust error correction arrangement provides the user with a label indicia reconstruction capability heretofore not found in existing labels. The error correction code provides sufficient data so that a robotic cartridge handling system or a bar code reader system can automatically reconstruct the entirety of the user identification number on the cartridge label even though a section of the cartridge label has been obliterated. The error correction code is a standard multi-bit error detection and correction code that can detect n errors and correct m errors in the data to which it is appended. The bar code data is written in binary format and the error correction code can correct code words that contain single bar errors or multiple bar errors in the bar code whether the errors are contiguous or not. No prior art media cartridge label system makes use of a self correcting bar code.

In addition, further indicia can be provided for the user to define the media cartridge, its characteristics, use, etc. beyond the standard six digit volume serial number presently in use. These additional digits can also be used for error correcting codes to provide additional robustness to the label coding.

DETAILED DESCRIPTION

In the data processing industry, the media of choice is the 3480-type magnetic tape cartridge. This tape cartridge has traditionally contained a single reel of magnetic tape on which is written digital data in a longitudinal format. The 3480-type magnetic tape cartridge is designed to allow a user to apply a cartridge label to one end thereof to uniquely identify the magnetic tape cartridge. The labels used on 3480-type magnetic tape cartridges are either human-readable only or human-readable and machine-readable. This later type of label was developed because of the use of automated cartridge library systems, such as the 4400 Automated Cartridge System manufactured by Storage Technology Corporation. An automated library system robotically stores and retrieves a large number of 3480-type magnetic tape cartridges for use by a plurality of tape drives that are connected to the library system. The automated cartridge library system maintains a data file that indicates the precise location of each magnetic tape cartridge that is stored therein. However, the library system also includes a camera attached to the robot arm retrieval system to identify each magnetic tape cartridge that is retrieved by means of reading the bar code that is imprinted on the label on the magnetic tape cartridge. By reading the bar code, the automated cartridge library system confirms the identity of this magnetic tape cartridge before placing it in a drive to read or write data therefrom.

The labels used on the 3480-type magnetic tape cartridges in this automated cartridge library system contain both human-readable and machine-readable indicia. In particular, these labels traditionally have included a series of machine and human-readable characters in the form of optical character recognition codes imprinted thereon. This series of characters represents the volume serial number (VOLSER) that identifies the magnetic tape cartridge. The bar code indicia replicates the characters of the optical character recognition code as does the color coding, where each printed color corresponds to a particular alphanumeric character imprinted on the cartridge label. The printing of the bar code, in prior art magnetic tape cartridge label systems, has been arranged such that if a portion of the label is ripped, the information contained thereon can still be reconstructed. In these labels, the remaining portion of the label contains sufficient bar code and OCR information to manually reconstruct the volume identification number by a user combining the machine and human-readable portions of the label that remain on the cartridge. This indicia redundancy is accomplished by printing the bar code to be read in a direction opposite to the direction of printing the human and machine-readable OCR characters. Therefore, the cartridge label contains a complete set of information in both the right half and the left half thereof and also in the top and bottom halves thereof so that up to half of the cartridge label could be torn off or curled up without losing the volume identification information.

Limitations of Existing Cartridge Labels

A significant difficulty with the arrangement of existing cartridge labels is that the magnetic tape cartridge must be removed from the automated cartridge library system and the information reconstruction must take place manually, since the automated cartridge library system reads only the bar code. A more common problem than ripping a portion of the cartridge label is that a segment of the cartridge label becomes smudged such that one or more of the bars of the bar code cannot be read by the camera system. In this case, a simple contamination of the cartridge label would cause the media cartridge to be ejected from the automated cartridge library system and require the operator to manually reconstruct the label information and in most cases replace the cartridge label with a new one.

A further complication is the fact that the 3480-type magnetic tape cartridge represents a standard form factor in use in the data processing industry. In order to migrate to media other than the standard longitudinally written magnetic tape contained therein, represents a major investment in new media and new drive types, including selecting media types that are incompatible with automated cartridge library systems, since these library systems are designed only to handle the 3480-type magnetic tape cartridges. In order to overcome this impediment, new cartridges have been designed to make use of the existing 3480-type magnetic tape cartridge form factor but which contain other media, such as helical scan tape, solid state memory, disk drives, and tapes of varying lengths, thicknesses and data recording characteristics. The use of a universal cartridge form factor to handle multiple types of media presents a further labeling problem in that an automated cartridge library system has no way of identifying the type of media contained within the media cartridge and must rely on the user correctly identifying the media drive on which this media cartridge is to be mounted. If the user does not properly specify the media drive, damage can occur to the media contained within the media cartridge and/or the media drive due to mounting the wrong media therein. In order to overcome this problem, it is desirable to include on the cartridge label a media identification indicia that specifies the media, contained within a media cartridge in both human-readable and machine-readable form. This media identification can be placed on separate media label which media label is placed on the media cartridge by the manufacturer or can be an integral part of the cartridge identification label placed thereon by the user. In either case, the simple volume identification label is no longer adequate for the needs of automated cartridge library system users.

Machine-Readable Label

Figure 1:
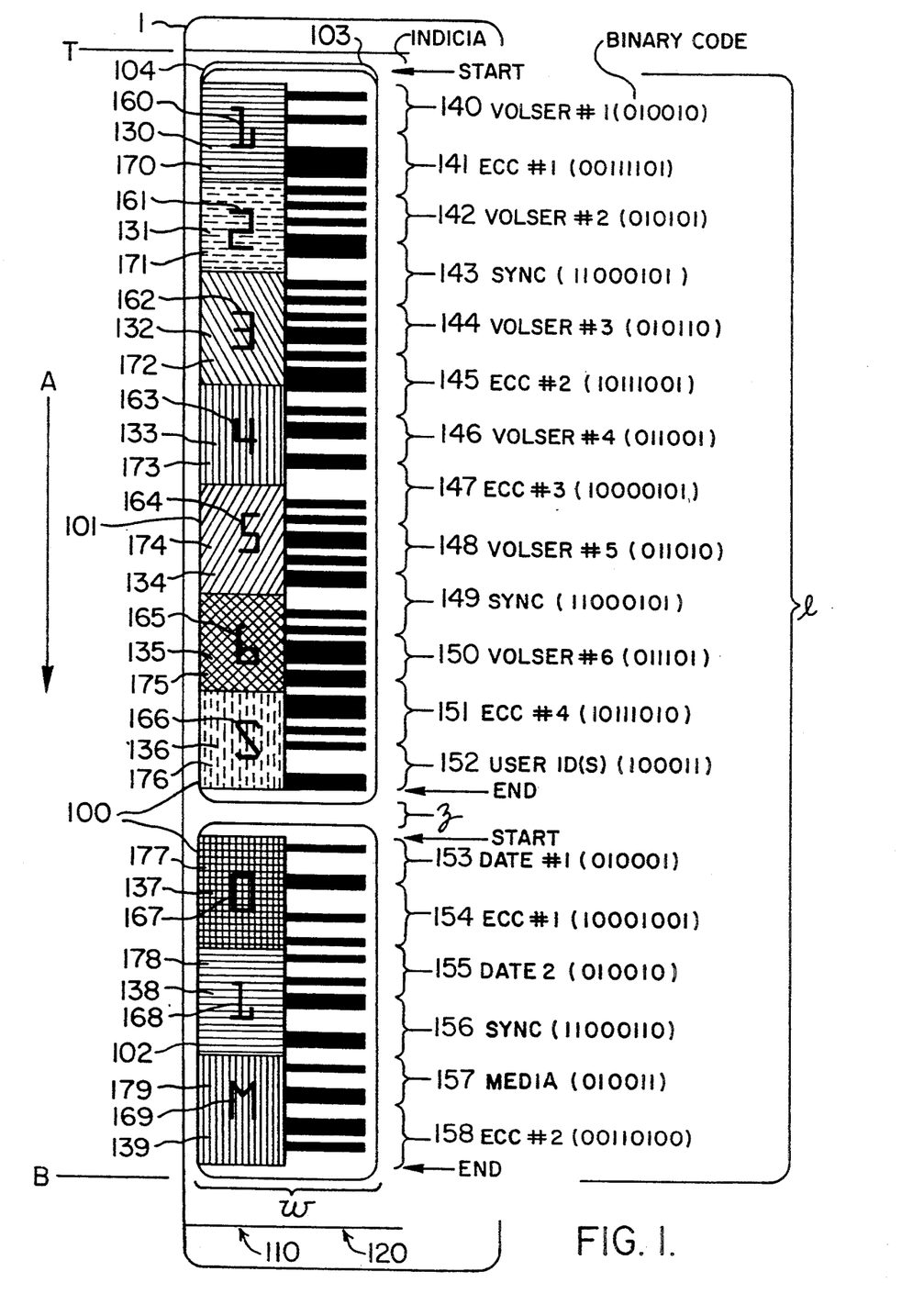
FIGS. 1-3 illustrate three embodiments of a media cartridge label having the robust coding system imprinted thereon.

FIG. 1 illustrates a typical configuration of the robust label 100 of the present invention that can be used on the magnetic tape cartridges 1 in an automated magnetic tape cartridge library system. The label 100 typically consists of an adhesively backed substrate 103 on which is attached surface 104 for printing indicia thereon. Label 100 is physically divided into two sections (101, 102) consisting of a media identification label 102 that is affixed to magnetic tape cartridge 1 by the manufacturer thereof to identify the media contained in cartridge 1 as well as the date of manufacture thereof (or manufacturer identification). The second section of label 100 is the volume identification label 101 that identifies magnetic tape cartridge 1 via a user specified code (VOLSER). The label 100 incorporates a machine-readable and human-readable coding system imprinted thereon to uniquely identify the magnetic tape cartridge 1 to which it is affixed.

Human-Readable Indicia

The first vertical column 110 of characters imprinted on label 100 is divided into a series of vertically aligned, rectangular segments 130–139. The rectangular segments are separated from a second vertically aligned column 120 of characters adjacent to and coextensive with the first vertical column 110 of characters by a line of predetermined width. One character 160–169 of a human-readable code is located within each rectangular segment 130–139 in the first column 110 of characters thereby forming a message in a first code. The second vertical column 120 contains a single rectangular segment containing a string of characters in a machine-readable code, such as a bar code. This string of characters in the second vertical column 120 comprises a message in a second code which is identical to the message formed in the first vertical column 110 in the human-readable code. In addition, the background 170–179 of each of the rectangular segments 130–139 contained within the first vertical column 110 can be suitably color coded to correspond to the respective characters 160–169 of human-readable code contained therein, thereby providing a message in a third code which is identical to the above-described messages of the first and second codes. The two vertical columns 110, 120 of characters imprinted with the first and second codes are so arranged for redundancy purposes. The message (1, 2, 3, 4, 5, 6, S, 0, 1, M) in the first vertical column 110 is printed to be read downward (direction A) from the top (T) to bottom (B) of label 100 and the digits of the bar code in the second vertical column 120 are printed to be machine-readable downward in the same direction.

For the purpose of simplicity, a simple serial, interleaved ordering of the volume identification, error correcting codes and media identification in the bar code field are presented in the embodiment shown herein. In the embodiment illustrated in FIG. 1, the label 100 is divided into two columns, a left column 110 and a right column 120, each of which extends from the top T to the bottom B of label 100. The left column 110 has a volume identification code consisting of n indicia 160–165 printed in human-readable form as well as a media identification code 169 consisting of s indicia imprinted thereon in human-readable form, a date code 167, 168 of q indicia, t user defined indicia 166, where n in this embodiment is equal to six, q is equal to two, t is equal to one and s is equal to one. The left column 110 is therefore divided into n+s+q+t indicia fields 130–139, each of which contains one human-readable printed indicia and can also be color coded to correspond to the indicia imprinted in that field.

Machine-Readable Indicia

The right hand column 120 of the cartridge label 100 contains information inclusive of that printed in the left hand column 110 of the cartridge label 100 as well as additional information in the form of error correcting code data 141, 145, 147, 151, 154, 158 and synchronization codes 143, 149, 156. The right hand column 120 is printed in bar code form in a simple binary arrangement rather than the three of nine bar coding of prior art labels in order to increase the data capacity of the label 100. The bar code contains a total of nineteen digits of indicia. Each indicia imprinted in bar code form requires six to eight bits to uniquely define the indicia within the range of desirable values to include alphanumerics and other preselected characters. Therefore, the right hand column 120 of cartridge label 100 includes m (19) indicia: n (6) volume identification indicia 140,142, 144,146,148,150, s (1) media identification indicia 157, p (3) synchronization characters 143, 149, 156, q (2) date code characters 153, 155, r (6) error correcting indicia 141, 145, 147, 151, 154, 158 to provide a self correction capability for label 100 and t (1) user defined indicia 152. The error correcting indicia 141, 145, 147, 151, 154, 158 are shown in FIG. 1 as consisting of two sets of error correcting indicia. The first set of error correcting indicia 141, 145, 147, 151 are used to protect the integrity of the data in the first section 101 of label 100 while a second set of error correcting indicia 154, 158 are used to protect the integrity of the data in the second section 102 of label 100. Alternatively, a single set of error correcting indicia can be used to protect the entirety of label 100.

Figure 2:
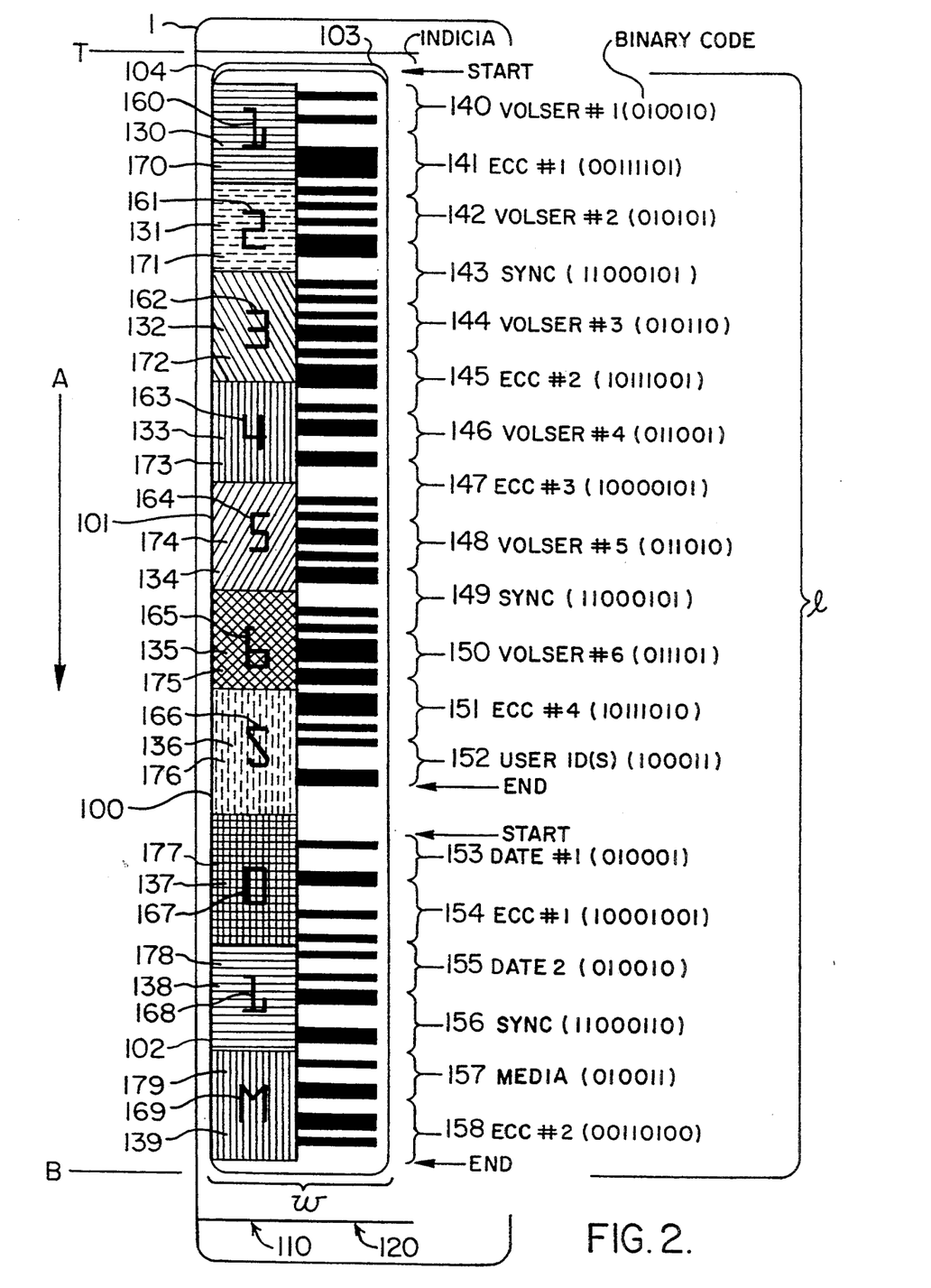
Figure 3:
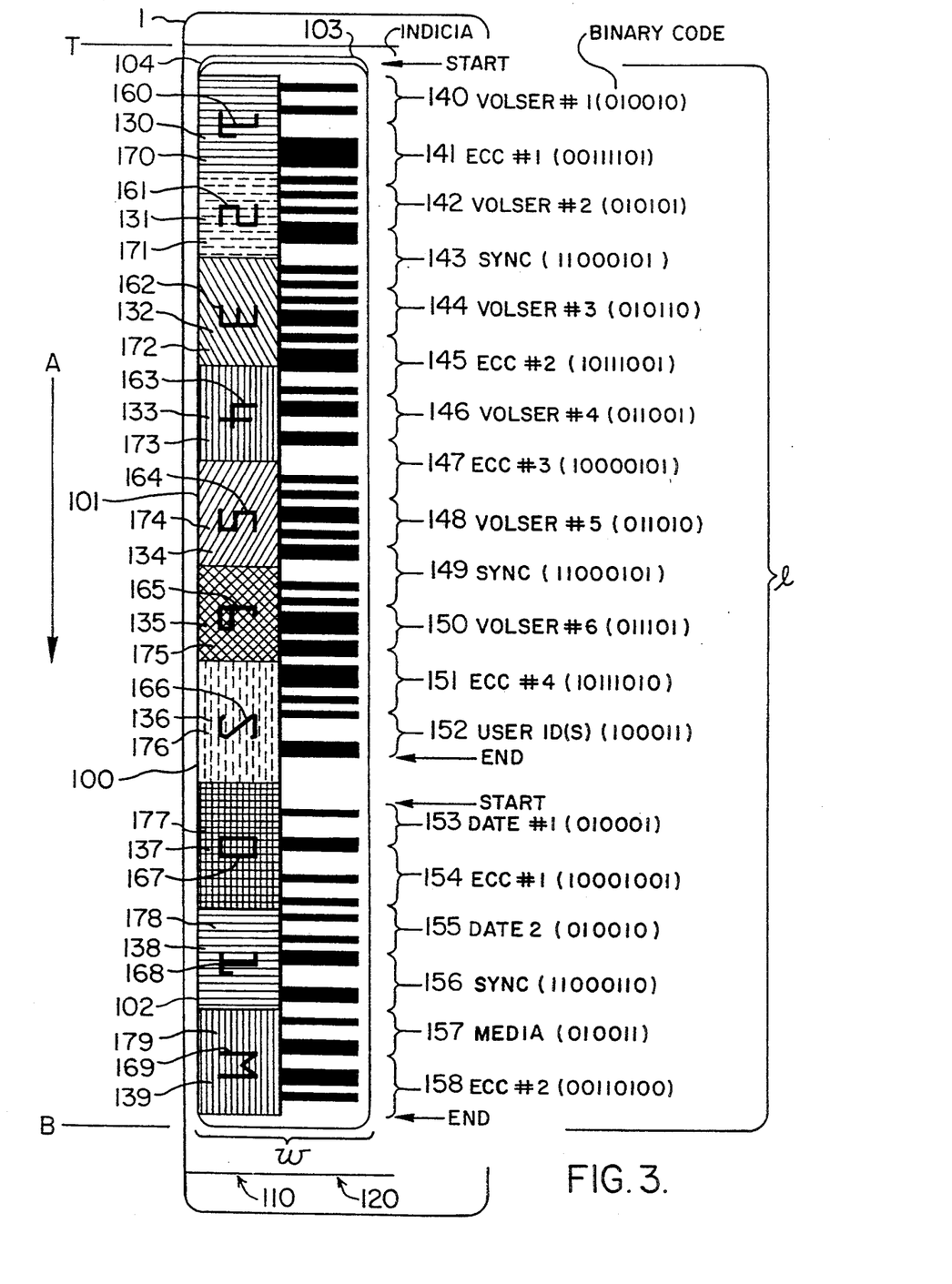

The label 100 illustrated in FIG. 2 is similar to the label 100 illustrated in FIG. 1, except the label 100 of FIG. 2 is a single physical piece rather than the two segments shown in FIG. 1. The human-readable indicia 160–169 in the first column 110 can also be rotated as shown in FIG. 3 to enable the volume identification number to be read when the media cartridge is placed in a horizontal position. It is obvious that various combinations and variations of the labels illustrated in FIGS. 1–3 are possible in terms of the bar code scheme used, number of indicia, orientation and ordering of the indicia.

Robust Coding System for Media Labels

The robust coding system of the present invention makes use of additional human-readable characters imprinted on the cartridge label in order to uniquely identify the media contained within the media cartridge. This information is also provided in machine-readable bar code form in order that an automated cartridge library system can verify the media type contained within media cartridge 1 before loading it into a media drive. The integrity of both the volume identification segment 101 and the media segment 102 of label 100 is protected by the use of a robust error correcting code imprinted thereon, which error correcting code can detect a plurality of errors and correct a lesser plurality of errors in the bar code. The bar code is written in binary form and contains significantly more indicia than the human-readable OCR characters 160–169 imprinted on the adjacent side 110 of label 100. The existing labels make use of a six digit volume identification number (VOLSER) and an eight digit bar code which contains the six digit volume identification number as well as a start and a stop character to delimit the VOLSER for the camera system.

The label coding system of the present invention makes use of a six character volume identification code (160–165) imprinted in human-readable form and a nineteen indicia bar code which includes the six indicia volume identification, two synchronization indicia, four digits of error correcting code and one indicia available for user coding or additional error correcting code digits. The use of a four digit error correcting code allows the detection of three errors and the correction of two errors contained in the bar code. The human-readable 110 and machine-readable 120 sides of label 100 are both printed to be read in the same direction (A) and the exact placement of the error correcting code indicia within the bar code field 120 is a matter of design choice. Thus, the error correcting code can be interleaved with or interposed in the middle of the volume identification indicia in the bar code field, scrambled in the bar code field or appear in any order since the bar code reader apparatus can reorder the series of indicia that are read from the cartridge label 100 into any ordering desired by the user.

Bar Code Encoder

Figure 4:
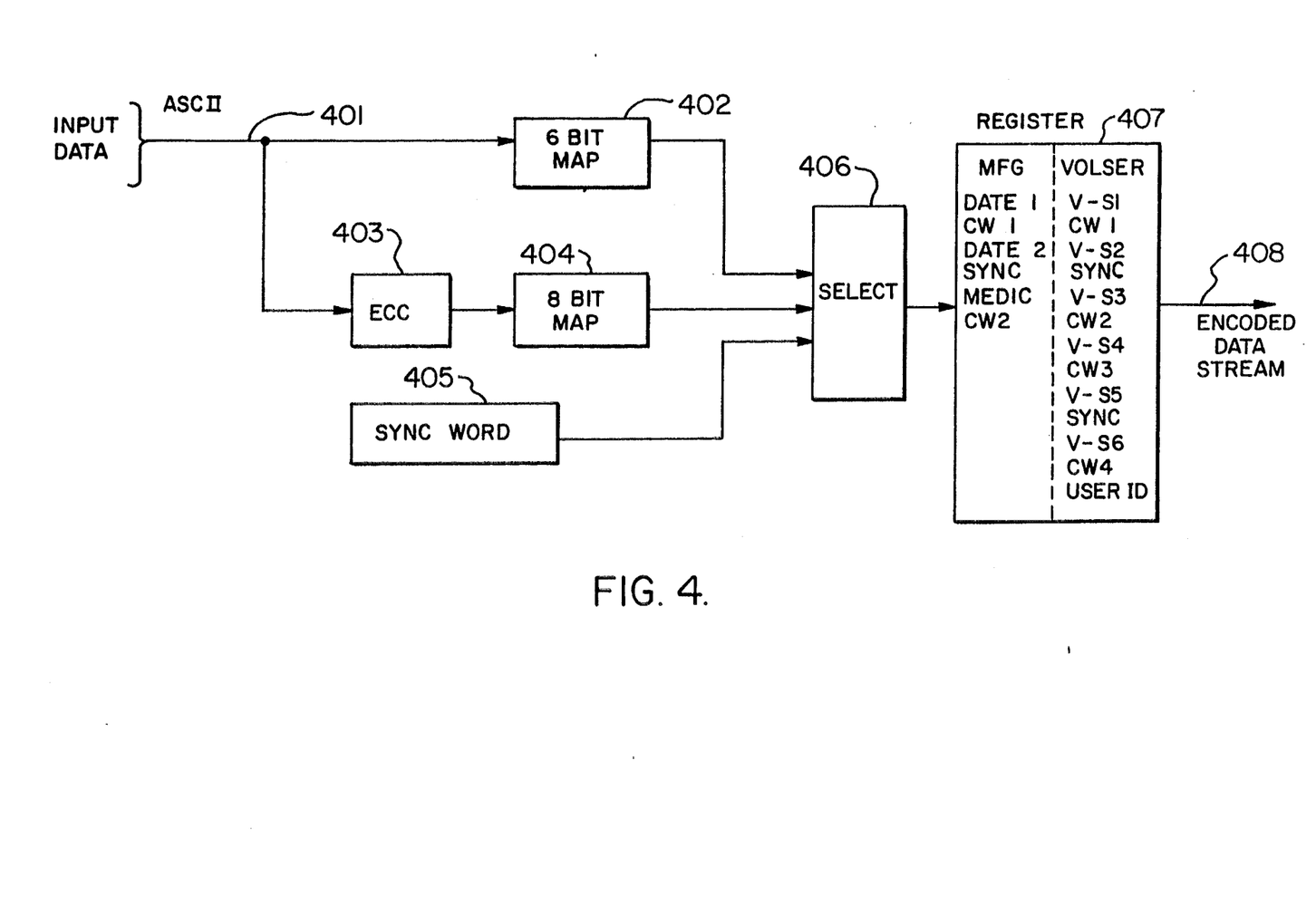
FIG. 4 illustrates an indicia generation system for use in producing a bar code for the label.

FIG. 4 illustrates in block diagram form an implementation of a bar code encoder circuit 400. Data is input in 7 bit ASCII format on lead 401 to 6 bit modulation code generation circuit 402 and ECC generator 403. The data is mapped by 6 bit modulation code generation circuit 402 into a 6 bit code word. Similarly, the output of ECC generator 403 is converted into an 8 bit code word by 8 bit modulation code generation circuit 404. Synchronization code words of 8 bits are generated by sync word generator 405. Select function 406 multiplexes the code words from 6 bit modulation code generation circuit 402, 8 bit modulation code generation circuit 404 and sync word generator 405 into register 407 in a predetermined pattern, and thence output at point 408. The data output at point 408 can be used to drive a printing system (not shown) to print the bar code data on label 100.

Modulation Code

The modulation code produced by the bar code generator of FIG. 4 guarantees data transitions necessary for an un-clocked code by utilizing only a portion of the code combinations available for a given bit run length. It also reduces the DC variations in the code during read back making detection easier. The data is directly encoded by mapping 7 bit ASCII data bytes into 6 bit transition balanced code words. Since only 46 states are needed to represent the limited ASCII data subset, only 6 bits are needed. Numbers are given the very best modulation codes, characters next, and punctuation characters are given the remaining codes. Other mappings can work equally as well and this mapping is simply illustrative of the invention.

The ECC check words are generated in 7 bit registers using ASCII input data. The resulting 7 bit check bytes are mapped into eight bits. 8 bits are needed to create a transition balanced code because all of the states are used in the ECC check word generation. The increase from the required 6 bits to 7 bits also allows for a more powerful error detection and correction capability without significant increase in overhead.

The synchronization word is separate from the ECC system because synchronization must occur first to establish code word boundaries. The sync word chosen has a very low auto-correlation characteristic which reduces the possibility of erroneous detection.

While a specific embodiment of this invention has been disclosed, it is expected that those skilled in the art can and will design alternate embodiments of this invention that fall within the scope of the appended claims.

We claim:

1. An encoded label for an item, comprising:
   a substrate, including a surface having pro-printed thereon at least two parallel redundant means for identifying said item;
   a first plurality of n indicia contained in n contiguous indicia locations within a first one of said identifying means, said first plurality of indicia defining a first indicia sequence expressive of a first indicator for identifying said item, where n is a positive integer greater than one;
   a second plurality of m indicia contained in m contiguous indicia locations within a second one of said identifying means, said second plurality of indicia defining a second indicia sequence expressive of a second indicator for identifying said item, where m is a positive integer greater than one and greater than n, wherein said second indicator includes said first indicator;
   wherein said second plurality of m indicia includes r error code indicia to enable reconstruction of a plurality of errors in said second indicia sequence when at least one of said indicia in said second indicia sequence on said label is illegible, where r is a positive integer greater than zero.

2. The encoded label of claim 1, wherein said item comprises a media cartridge, further comprising:
   s media identification indicia, included in said m indicia of said second plurality of indicia, for identifying a class of media contained in said media cartridge, where s is a positive integer greater than zero.

3. The encoded label of claim 1 wherein said first plurality of indicia are printed in human-readable form.

4. The encoded label of claim 1 wherein said second plurality of indicia are printed in machine-readable form.

5. The encoded label of claim 2 wherein said label includes a first label section that includes indicia identifying said item and a second label section that includes said s media identification indicia, said first and said second label sections are physically separate from each other.

6. The encoded label of claim 1 wherein said first and said second plurality of indicia are printed to be read in the same direction on said label.

7. The encoded label of claim 1 wherein said first and said second plurality of indicia are printed to be read in reverse directions on said label.

8. The encoded label of claim 1 wherein n of said m indicia of said second plurality of indicia correspond on a one-to-one basis to said n indicia of said first plurality of indicia.

9. The encoded label of claim 8 wherein said n indicia of said first plurality of indicia and said n corresponding indicia in said second plurality of indicia fail to comprise a complete message in both a top half and a bottom half of said encoded label.

10. The encoded label of claim 1 further comprising:
a third plurality of indicia comprising n color fields, each one of said n color fields coded to correspond to one of said n indicia in said first plurality of indicia, each of said third plurality of indicia being printed in an indicia location corresponding to said corresponding one of said n indicia.

11. An encoded label for uniquely identifying an item on which said encoded label is affixed, comprising:
a substrate, having a surface for containing printed indicia, which printed indicia are contained in first and second predefined fields on said surface;
a first set of indicia in human-readable form printed in said first predefined field for defining an item identification; and
a second set of indicia in machine-readable form printed in said second predefined field for defining both said item identification and a set of error correction code indicia for correcting a plurality of errors in said item identification if a portion of said item identification in said second predefined field fails to be machine-readable.

12. The encoded label of claim 11, wherein said item comprises a media cartridge, further including:
at least one indicia included in said first set of indicia for identifying a type of media contained in said media cartridge.

13. The encoded label of claim 11, wherein said item comprises a media cartridge, further including:
at least one indicia included in said second set of indicia for identifying a type of media contained in said media cartridge.

14. The encoded label of claim 13 wherein said label includes a first label section that includes said item identification and a second label section that includes said media identification indicia wherein said first and said second sections are physically separate from each other.

15. The encoded label of claim 11 wherein said surface has a length and a width, said first and second fields being oriented juxtaposed to each other in parallel relationship along said length of said surface.

16. The encoded label of claim 15 wherein said first and second sets of indicia are printed to be read along said length in one direction.

17. The encoded label of claim 15 wherein said first and second sets of indicia are printed to be read along said length in opposite directions.

18. The encoded label of claim 17 wherein said first and said second sets of indicia fail to comprise a complete message in both a top half and a bottom half of said label taken along said length.

19. The encoded label of claim 11 further comprising:
a third set of indicia in color coded form printed in said first predefined field for defining an item identification, wherein each one of said indicia of said third set of indicia is coded to correspond to one of said indicia in said first set of indicia to define said item identification which is redundant to said item identification formed by said first set of indicia.

20. The encoded label of claim 19 wherein each of said color coded indicia in said third set of indicia is printed in said first predefined field collocated exclusively with said corresponding indicia in said first set of indicia.

21. The encoded label of claim 11 wherein said item identification and said error correction code indicia are interleaved together to form said second set of indicia.

22. The encoded label of claim 12 wherein said item identification and media type identification indicia are concatenated together to form said first set of indicia.

23. The encoded label of claim 13 wherein said item identification, said media identification indicia and said error correction code indicia are interleaved together to form said second set of indicia.

24. An encoded label for uniquely identifying a media cartridge on which said encoded label is affixed, comprising:
a substrate, having a surface for containing printed indicia, which printed indicia am contained in first, second and third predefined fields on said surface;
a first set of indicia in human-readable form printed in said firm predefined field for defining a media cartridge identification;
a second set of indicia in machine-readable form primed in said second predefined field for defining said media cartridge identification; and
a third set of indicia printed in said third predefined field for defining a media type contained within said media cartridge;
wherein at least one of said second set of indicia and said third set of indicia includes at least one error correction code indicia for correcting a plurality of errors if a portion of said encoded label fails to be machine-readable.

25. The encoded label of claim 24 wherein said media cartridge identification and said error correction code indicia are interleaved together to form said second set of indicia.

26. The encoded label of claim 24, wherein said third set of indicia includes:
at least one indicia in human-readable form to identify a type of media contained in said media cartridge.

27. The encoded label of claim 24, wherein said third set of indicia includes:
at least one indicia in machine-readable form to identify a type of media contained in said media cartridge.

28. The encoded label of claim 27 wherein said label includes a first label section that includes said media cartridge identification and a second label section that includes said media identification indicia, wherein said first and said second sections are physically separate from each other.

29. The encoded label of claim 24 wherein said surface has a length and a width, said first and second fields being oriented juxtaposed to each other in parallel relationship along said length of said surface.

30. The encoded label of claim 29 wherein said first and second sets of indicia are printed to be read along said length in one direction.

31. The encoded label of claim 29 wherein said first and second sets of indicia are printed to be read along said length in opposite directions.

32. The encoded label of claim 31 wherein said first and said second sets of indicia fail to comprise a complete message in both a top half and a bottom half of said label taken along said length.

33. The encoded label of claim 24 further comprising:
a third set of indicia in color coded form printed in said first predefined field for defining an item identification, wherein each one of said indicia of said third set of indicia is coded to correspond to one of said indicia in said first set of indicia to define said item identification which is redundant to said item identification formed by said first set of indicia.

34. The encoded label of claim 33 wherein each of said color coded indicia in said third set of indicia is printed in said first predefined field collocated exclusively with said corresponding indicia in said first set of indicia.

35. An encoded label for uniquely identifying a media cartridge on which said encoded label is affixed, comprising:
a substrate, having a surface for containing printed indicia, which printed indicia are contained in first, second and third predefined fields on said surface;
a first set of indicia in human-readable form printed in said first predefined field for defining an item identification;
a second set of indicia in machine-readable form printed in said second predefined field for defining said item identification, including:
at least one error correction code Indicia for correcting a plurality of errors in said media cartridge identification if a portion of said media cartridge identification falls to be machine-readable;
a third set of indicia printed in said third predefined field for defining a media type contained within said media cartridge, including:
at least one indicia in human-readable form to identify a type of media contained in said media cartridge,
at least one indicia in machine-readable form to identify a type of media contained in said media cartridge,
at least one error correction code indicia for correcting plurality of errors in said media type identification if a portion of said media type identification fails to be machine-readable.

36. The encoded label of claim 35 wherein said item identification and said error correction code indicia are interleave together to form said second set of indicia.

37. The encoded label of claim 35 wherein said surface has a length and a width, said first and second fields being oriented juxtaposed to each other in parallel relationship along said length of said surface.

38. The encoded label of claim 37 wherein said first and second sets of indicia are printed to be read along said length in one direction.

39. The encoded label of claim 37 wherein said first and second sets of indicia are printed to be read along said length in opposite directions.

40. The encoded label of claim 39 wherein said first and said second sets of indicia fail to comprise a complete message in both a top half and a bottom half of said label taken along said length.

41. The encoded label of claim 35 wherein said third set of indicia is in color coded form in said first predefined field for defining said item identification, wherein each one of said indicia of said third set of indicia is coded to correspond to each one of said indicia in said first set of indicia defining said item identification, and is redundant with said item identification formed by said first set of indicia.

42. The encoded label of claim 41 wherein each of said color coded indicia in said third set of indicia is printed in said first predefined field collocated exclusively with said corresponding indicia in said first set of indicia.

43. The encoded label of claim 1 wherein said second plurality of m indicia includes p synchronization indicia and g date code indicia.

* * * * *